United States Patent [19]

Chadwick et al.

[11] Patent Number: 4,996,655
[45] Date of Patent: Feb. 26, 1991

[54] REAL TIME MONITORING OF REMOTE SIGNALS IN AN INDUSTRIAL ENVIRONMENT

[75] Inventors: Gary L. Chadwick; Joe F. Johnson, both of Boise, Id.

[73] Assignee: Micron Technology, Inc., Boise, Id.

[21] Appl. No.: 312,595

[22] Filed: Feb. 16, 1989

[51] Int. Cl.$^5$ .............................................. G05B 23/00
[52] U.S. Cl. .................................. 364/550; 340/679; 340/870.28; 364/146
[58] Field of Search ................... 340/679, 680, 825.04, 340/870.28; 364/146, 188, 550, 551.01, 551.02

[56] References Cited

U.S. PATENT DOCUMENTS

| | | | |
|---|---|---|---|
| 3,638,191 | 1/1972 | Mann | 340/679 X |
| 3,858,181 | 12/1974 | Goldsby et al. | 340/679 X |
| 4,404,625 | 9/1983 | Saito et al. | 364/146 X |
| 4,642,782 | 2/1987 | Kemper et al. | 364/550 |
| 4,866,436 | 9/1989 | Kordts et al. | 340/870.28 |

OTHER PUBLICATIONS

IBM-Personal Computer Hardware reference Library, pp. 2-9 to 2-12.

Primary Examiner—Parshotam S. Lall
Assistant Examiner—Edward R. Cosimano
Attorney, Agent, or Firm—Stanley N. Protigal; Angus C. Fox, III

[57] ABSTRACT

A signal timing analyzer monitors a programmable logic control (PLC) of an industrial machine. Signal states of the PLC are sampled and the signal information is then transferred to a receiver card which is connected to a computer data bus. This allows the computer to monitor a piece of equipment by "eavesdropping" on the industrial controller that is actually operating and monitoring the equipment. The analyzer uses an on-board clock and timing circuit, so that the computer is not limited by the computer's clock speed in controlling sampling rates.

24 Claims, 6 Drawing Sheets

REAL TIME MONITORING OF REMOTE SIGNALS IN AN INDUSTRIAL ENVIRONMENT

FIELD OF THE INVENTION

The present invention relates to a signal timing analyzer, more specifically to monitoring electrical or electro-magnetic signals, and to transporting the signal information to a remote location for direct access and analysis by computer software.

DESCRIPTION OF THE PRIOR ART

Computer monitoring of electrical or electro-magnetic signals is presently accomplished with a data acquisition board which is installed in the computer and connected directly to the signal lines of interest. Where the connections use electrical conductors, the separation distance of the computer and the system being monitored is limited. The need often arises to have the computer located in a remote location from the system it is monitoring. An increased distance is also desirable when several systems to be monitored are spread over a wide area.

SUMMARY OF THE INVENTION

One object of the present invention is to provide a method for monitoring signal timing of a system which is located up to 500 meters away from the host computer.

Another object of the present invention is to provide an apparatus to allow for remote signal monitoring which is immune to electro-magnetic interference, voltage potential differences, and is suitable for operating in an industrial manufacturing environment.

Another object of the present invention is to provide for a "non-contact" method of monitoring programmable logic controller outputs through the use of photodetector transistors which detect the on-off states of the programmable logic controller LEDs.

The present invention relates to a signal timing analyzer, more specifically to an apparatus for monitoring electrical or electro-magnetic signals, sampling the signal states, and transporting the signal information to a remote computer or CPU. The sampling and transmission circuitry is self-controlled and electrically isolated from the signals being monitored and the host computer. The serial transmission of the data uses a fibre optic cable which is immune to electro-magnetic noise common to industrial manufacturing environments, and immune to voltage drops which occur with electrical transmissions over significant distances. The sampled signal data is then reconstructed on the computer interface board for direct access and analysis by the computer software.

The present invention was designed to allow an IBM PC or other MS DOS compatible computer to monitor a piece of equipment by "eavesdropping" on the industrial controller that is actually operating and monitoring the equipment. (MS DOS, TM Microsoft Corporation)

The industrial controller has plug-in modules that can each monitor some number of digital input signals (typically eight—one byte); the module also has a set of LEDs to indicate the state of each of the signals. Because the industrial controller has several of these i/o modules, and because it has other functions to attend to, it cannot read the state of any one module fast enough to capture all the transitions the module is monitoring.

Our invention is basically a means of monitoring the LEDs on the controller's i/o module(s) to allow a PC to monitor the signals of interest in [effectively] real-time, without making any sort of electrical connection to the signals or the industrial controller.

The system consists of a remote capture/transmitter unit, a receiver card (that plugs into an expansion slot within the PC) and the fiber optic cable that connects the two.

The remote unit contains a power supply, a number of 8-bit input capture circuits, a switch-selectable sample interval timer, a self-clocking input register selection circuit, a high-speed serial encoder/transmitter chip, a fiber-optic transmitter, and a clock oscillator circuit.

Each input bit has a photo-Darlington transistor driving one input of voltage comparator. The comparator output is buffered through a Schmitt-trigger line driver and latched by a 'D' flip-flop. The other input of all the comparators is connected to a simple resistive voltage divider. In operation, the photo-Darlington is held in close proximity to the LED of interest by a fixture designed to attach to the i/o module in non-permanent fashion.

The sample interval timer consists of cascaded, binary counters clocked by the clock oscillator. Dip switch modules select a binary number to be preloaded into the counters at the start of each sample interval.

The input register selection circuit consists of a binary counter coupled to one of eight demultiplexers, plus some associated discrete logic.

In operation, the dip switches are set to a count that will generate sample intervals of the desired period, i.e., at a rate slightly above the Nyquist sampling rate of the signals under observation. By coupling the counter output signal back to its load input clock, an output pulse just one clock oscillator cycle wide is generated, and the counter begins a new count for the next sampling period without any reset overhead. This results in a repeatable, jitter-free sample period, dependent only on the stability of the clock oscillator to set the accuracy of the sampling. This counter output pulse, signaling the start of sample period, also initiates the transfer of captured input states in a high-speed burst to the receiving module, and is subsequently referred to as "start of burst", or "SOB".

The SOB signal clocks all the input circuit D-flip-flops, capturing the current state of all the input signals. SOB also clocks a flip-flop into a SET state which, in turn, set the input to the second flip-flop low. At the next rising edge of the clock oscillator, the second flip-flop clocks the low to its Q output, which is the /LOAD signal to the encoder chip. This signal causes the encoder chip to load the selected set of eight input bits into its input register and begins the serialization and encoding process. Loading the encoder's input register also sets its FULL flag. The activation of this signal both resets the second flip-flop (which de-asserts the /LOAD signal) and clocks the input selection counter. The decoded selection count enables the output drivers of the next set of eight input D latches. After a few serial bits have been transmitted, the encoder chip de-asserts its FULL flag, which releases the second flip-flop to clock on the next rising edge of the clock oscillator.

This cycle of the second flip-flop setting, asserting /LOAD, the encoder responding with FULL, de-asserting /LOAD and the select counter incrementing, FULL de-asserting repeats until the ripple-carry-out from the select counter resets the first flip-flop. Resetting the first flip-flop disables the second flip-flop (preventing the assertion of /LOAD) and clears the select counter. This leaves the system waiting for the SOB pulse with the first input channel already selected and the data present at the encoder's input.

Because the LEDs typically are not uniform in brightness or mounting, each photo-darlington receives a different amount of light. This, coupled with the fact that the sensitivity of the photo-darlingtons peaks in the infra-red region typical of silicon photodetectors while the LEDs generate a narrow red spectrum well below the infra-red prevents the photo darlingtons from saturating when the LEDS are on. This means that when operated in an open-collector mode, the photo darlingtons may not sink enough current to generate valid logic LOWs for the input registers. To remedy this, the outputs of the photo darlingtons are compared against a reference voltage, allowing the detection of logic LOWs that are actually higher than that required for normal logic HIGH levels. But because the comparators are relatively slow, their outputs are buffered through Schmitt-trigger gates to prevent problems with the input D flip-flops.

The receiver card consists of a fiber-optic receiver, high-speed serial receiver/decoder chip, a number of 8-bit data registers and associated selection logic, switch selectable i/o address decoding, transmission status register, and clock oscillator.

In operation, the decoder chip reads the serial data provided by the fiber optic receiver and generates an ACTIVE signal when a burst transmission is being received. Asserting ACTIVE also increments the missed transfer counter in the status register.

When each received data byte is received, the decoder asserts AVAIL, which releases the set input of a D flip flop. On the next rising edge of the clock oscillator, the flip-flop generates a /READ signal. This enables the output drivers on the decoder and simultaneously enables the output register selectors. At the next rising edge of the oscillator clock, /READ is deasserted, causing the selected output register to latch the data presented by the decoder. Subsequently, the decoder de-asserts AVAIL, which prevents the flipflop from clocking until the next byte is received and ready, and increments the select counter.

This cycle of receiving a byte, asserting AVAIL, asserting then de-asserting /READ to latch the byte, then de-asserting AVAIL to increment the select counter is repeated until the decoder detects that end of the burst transmission. ACTIVE is then de-asserted, which in turn asserts /RDY.

The status and data registers are read by the computer by asserting the bus signal /IOR after placing the appropriate i/o address on the system address lines SA0–SA19 with /BALE and /AEN. The i/o address is compared to the one set on the dip switches. If the upper four nibbles match, the lowest nibble is decoded through the 1-of-8 demultiplexers to generate a single read-register strobe /RDR1–/RDR15 or /RDSTAT (also referred to as /STATUS).

If /STATUS is asserted when no transmission is being received (/RDY is asserted), all the received data registers are clocked into holding registers simultaneously, and the status register is updated just as its contents are placed on the computer's data bus. Updating the status also clears the missed transfer counter and overflow flag.

The status register contains the /RDY flag, a transmission error flag, the missed transfer counter, and a missed transfer counter overflow flag.

Under normal operating conditions, the receiver portion functions automatically, asynchronously to, and independently of the computer bus. The status register provides a method to temporarily synchronize the two. By reading the status register when no transmission is being received, the output registers are automatically updated so that they can be read with confidence, even if a new transmission starts (and some bytes are received) before completing the read of all the data registers. The missed transfer counter provides a way to tell how many transfers have occurred since the data registers were last read out. If the counter reached a specific upper limit, the overflow flag is set until it is read out with the status. This capability also allows the executing program to figure out how often it is sampling the data with a resolution much better than normally available on a PC.

DETAILED DESCRIPTION OF THE PREFERRED EMBODIMENT

Figure 1:
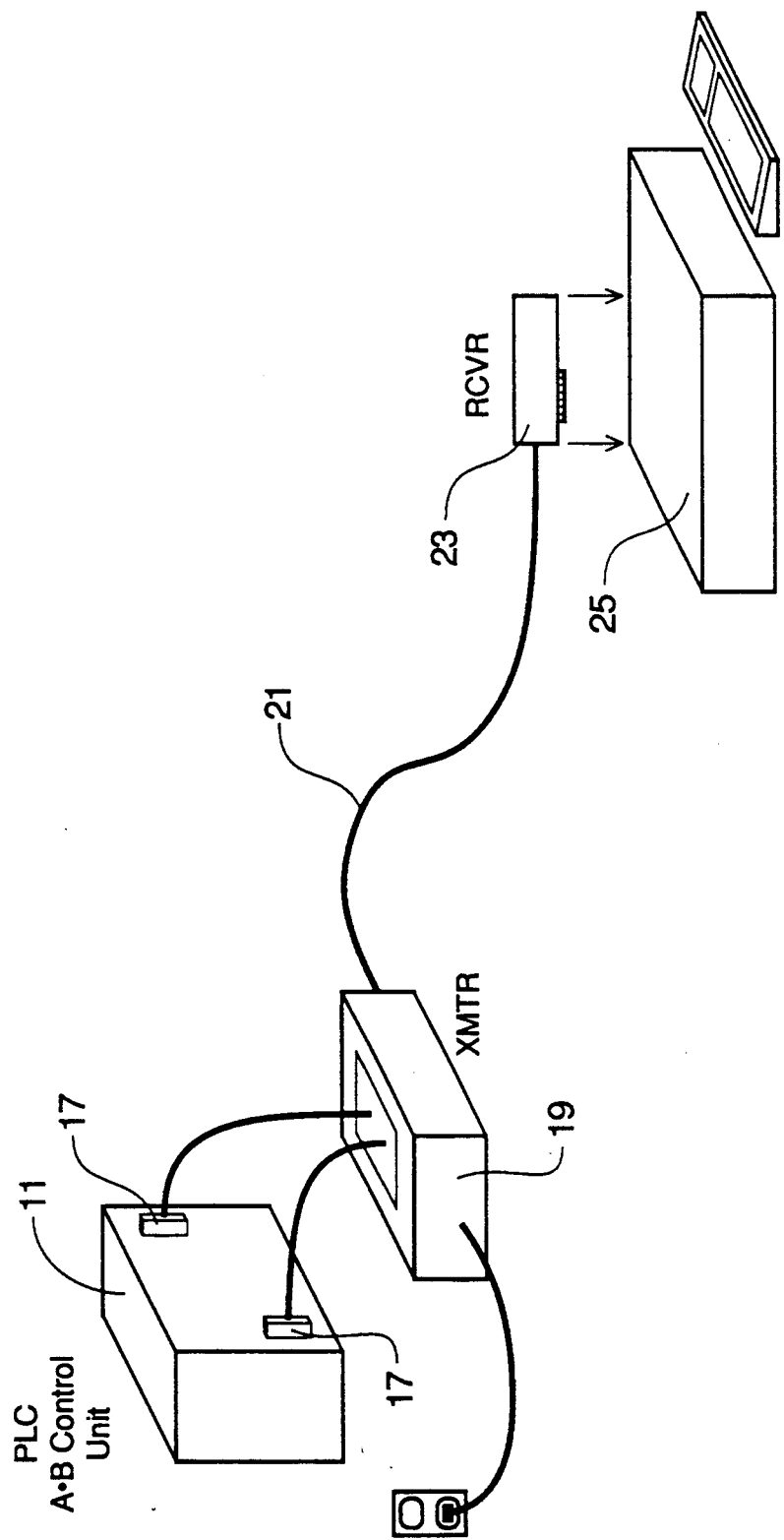
FIG. 1 shows the configuration of the preferred embodiment of the invention.

FIG. 1 shows the configuration of the invention. Signals, such as optical signals, are provided by a process control unit 11, and are provided as direct readouts of various process control signals. The process control unit 11 of the preferred embodiment is an Allen-Bradley Programmable Logic Controller (PLC). PLC are used in a variety of applications, such as machine fabrication, chemical process control and other automated industrial operations. The invention is intended to improve on such process control by monitoring the operation of the PLC.

Figure 2:
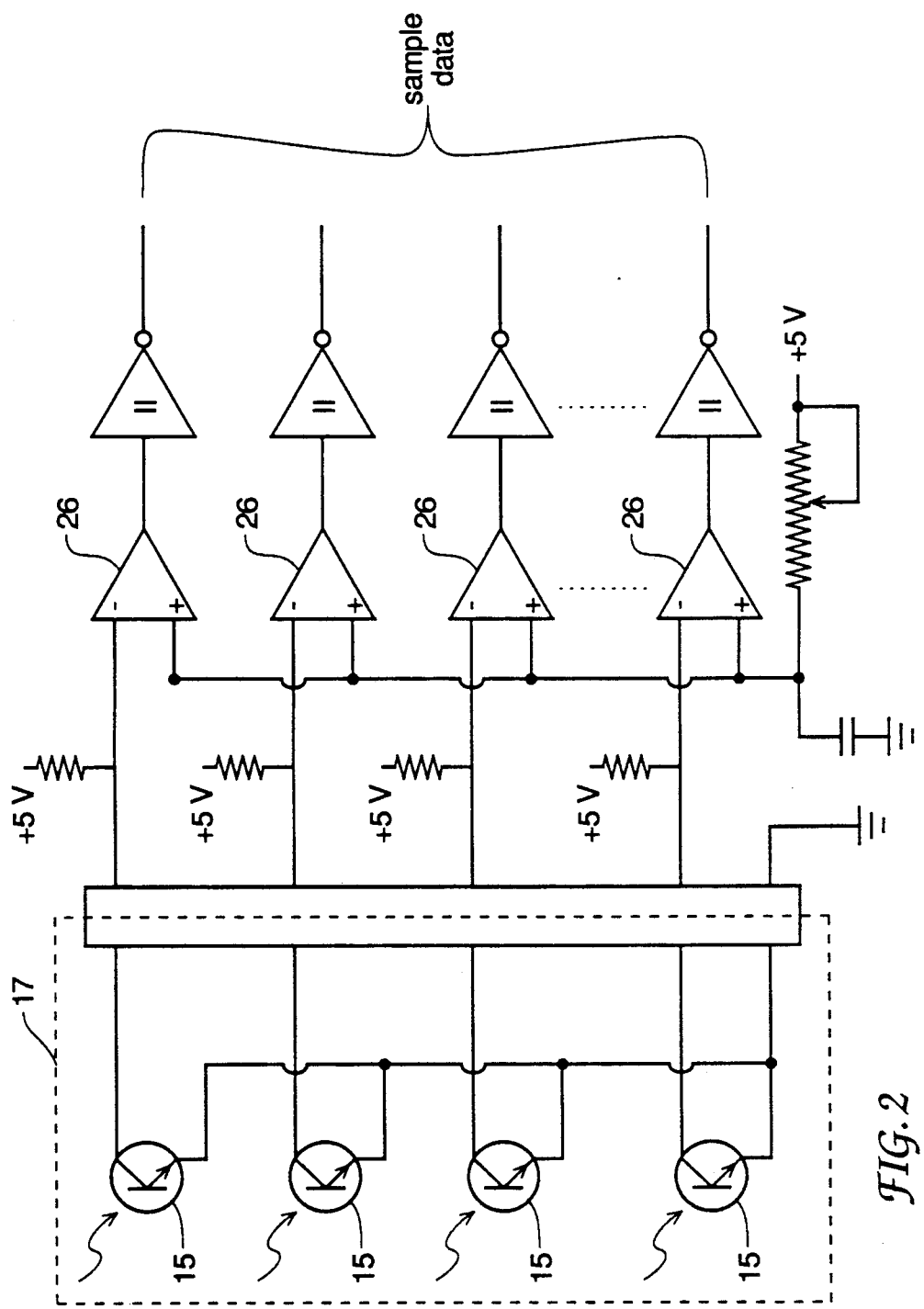
FIG. 2 shows a signal monitor assembly used with the present invention.

A plurality of photodetectors 15 are located in one or more signal monitor assemblies 17, as shown in FIG. 2. Referring to FIG. 1, the signal monitor assemblies 17 are connected to a transmitter 19. The transmitter, in turn, sends signals over a fiber optic cable 21 to a receiver card 23. The receiver card 23 is connected to a computer 25, which is, in the preferred embodiment, a DOS Compatible computer, such as an IBM AT or IBM XT. The card 23 fits into the computer's address bus in a conventional manner.

The invention functions as a signal timing analyzer for monitoring electrical or electro-magnetic signals, sampling the signal states, and transporting the signal information to the remote computer 25 or to a CPU.

The present invention was designed to allow the computer 25 to monitor a piece of equipment by "eavesdropping" on the industrial controller that is actually operating and monitoring the equipment.

The PLC 11 has plug-in modules that can each monitor some number of digital input signals (typically eight—one byte). The PLC 11 also has a set of LEDs to indicate the state of each of the signals. Because the PLC 11 has several of these i/o modules, and because it has other functions to attend to, it cannot read the state of any one module fast enough to capture all the transitions the module is monitoring. For this reason, the outputs of the LEDs are detected signal monitor assemblies 17.

Figure 3:
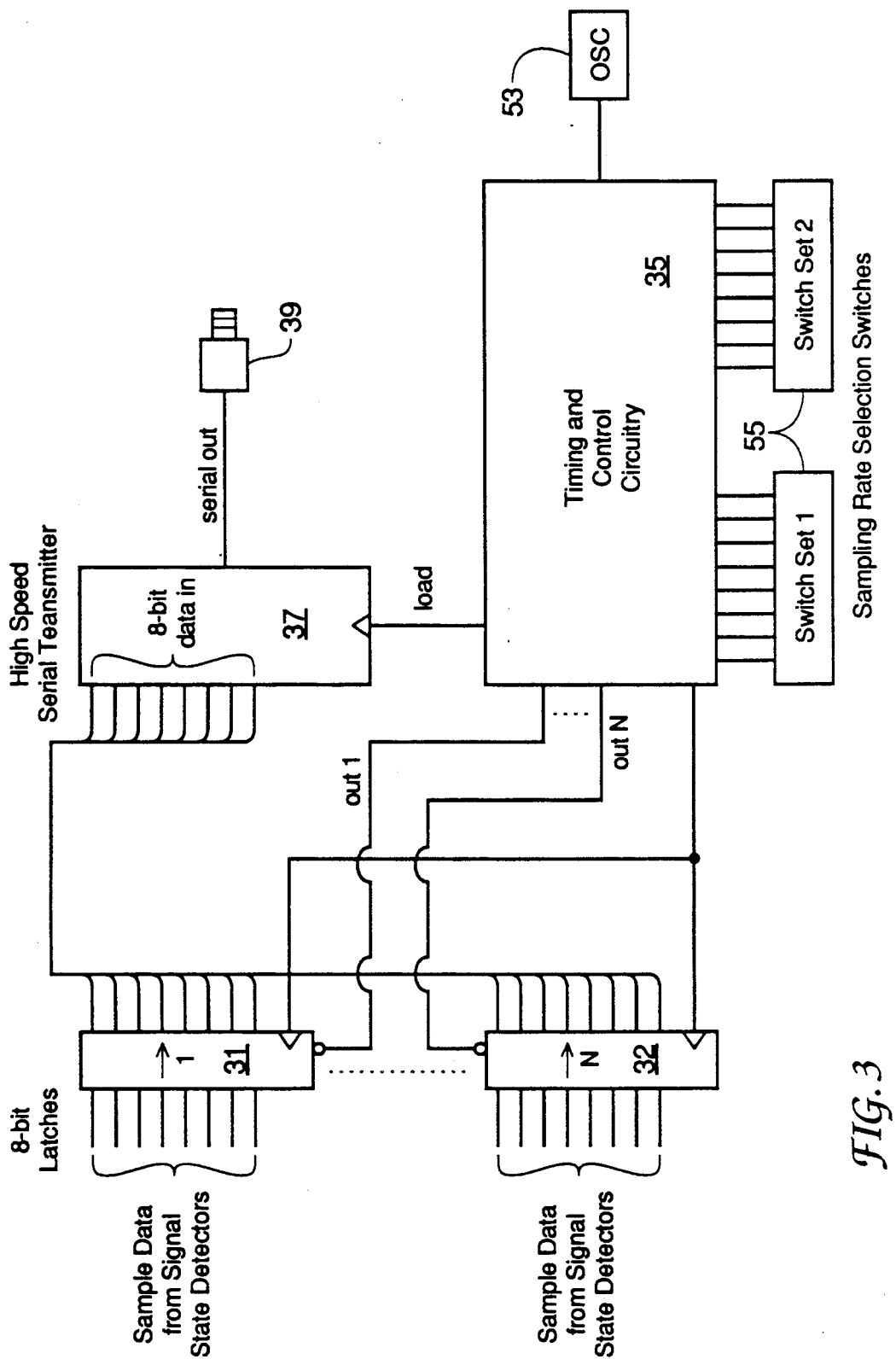
FIG. 3 is a block diagram of a detector circuit used with the embodiment of FIG. 1.

Referring to FIG. 3, the data from the signal monitor assemblies 17 is received by a number of latches 31, 32 sufficient to latch the data from the photodetectors 15. In the preferred embodiment, each signal monitor assembly 17 has associated with it one 8-bit latch 31, 32. The latches hold the data from the photodetector assemblies 17 until a timing and control circuit 35 provides an OUT address signal to address the individual latch 31, 32. The latched data is transmitted to a high speed serial transmitter 37, which receives the 8 bits of latched data and transmits the data in a serial data train. This serial data is then able to be communicated to the receiver card 23 for computer analysis.

Referring again to FIG. 1, the remote capture/transmitter unit 19 is used to receive signals from the signal monitor assemblies 17. The remote unit 19 transmits these signals to a receiver card 23, in order to provide the monitored signals to the computer 25. The transmitter unit 19 is connected to the receiver card 23 by the fiber optic cable 21.

Referring to FIG. 3, the remote unit 19 contains a power supply (not shown), a number of 8-bit input capture circuits which take the form of latches 31, 32, a switch-selectable sample interval timer 35, which functions as a self-clocking input register selection circuit, a high-speed serial encoder/transmitter chip 37, and a fiber-optic transmitter 39.

Figure 4:
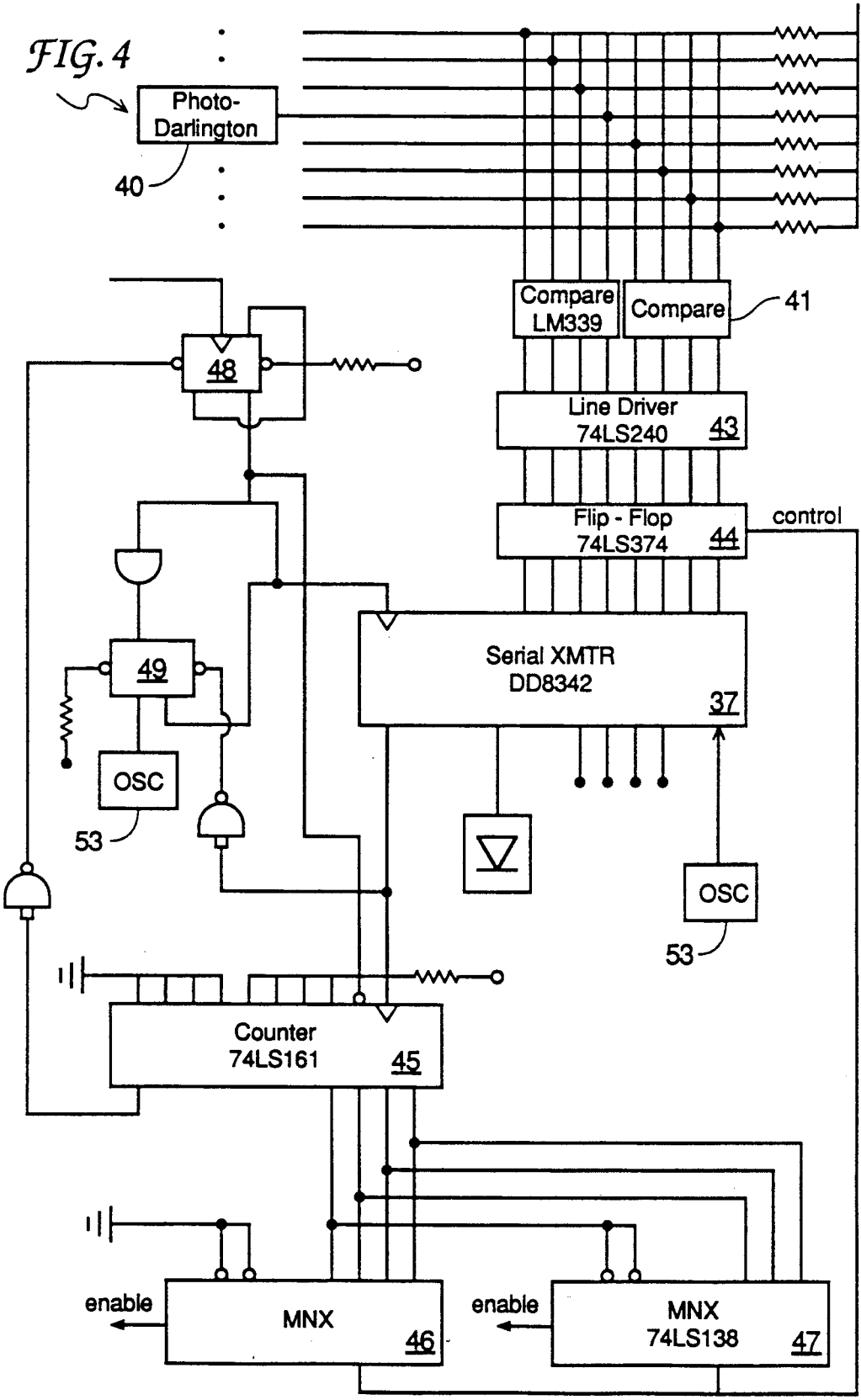
FIG. 4 shows the circuit of FIG. 3.
Figure 5:
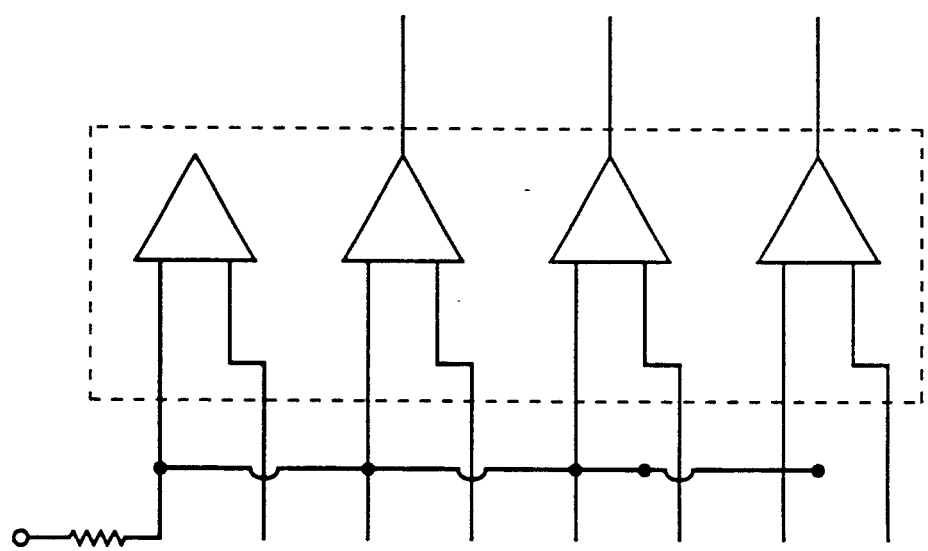
FIG. 5 shows details of a comparator circuit which is used to control threshold sensing by the detector circuit of FIG. 4.

FIG. 4 schematically shows details of the remote unit 19. Each input bit has a photo-Darlington 40 transistor driving one input of a voltage comparator 41. The comparator output is buffered through a Schmitt-trigger line driver 43 and latched by a 'D' flip-flop 44. (In the preferred embodiment, one or more integrated circuit chips 44, containing plural flip-flops are used, so that multiple flip-flops appear on the same circuit.) The other input of all the comparator 41 is connected to a simple resistive voltage divider, as represented in FIG. 5. In operation, the photo-Darlington transistor is held in close proximity to the LED of interest by a fixture designed to attach to the i/o module in non-permanent fashion.

The sample interval timer 35 consists of cascaded, binary counters clocked by a clock oscillator 53. Dip switch modules 55 select a binary number to be preloaded into the counters 45 at the start of each sample interval.

In operation, the dip switches in the dip switch modules 55 are set to a count that will generate sample intervals of the desired period, i.e., at a rate slightly above the Nyquist sampling rate of the signals under observation. By coupling the counter 45 output signal back to its load input clock, an output pulse just one clock oscillator cycle wide is generated, and the counter 45 begins a new count for the next sampling period without any reset overhead. This results in a repeatable, jitter-free sample period, dependent only on the stability of the clock oscillator 53 to set the accuracy of the sampling. This counter output pulse, signaling the start of sample period, also initiates the transfer of captured input states in a high-speed burst to the receiving module 23, and is subsequently referred to as "start of burst", or "SOB".

The SOB signal clocks all the input circuit D-flip-flops 44, capturing the current state of all the input signals. SOB also clocks a flip-flop 44 into a SET state which, in turn, set the input to the second flip-flop 44 low. At the next rising edge of the clock oscillator 53, the second flip-flop 44 clocks the low to its Q output, which is the /LOAD signal to the serial transmitter 37. This signal causes the serial transmitter 37 to load the selected set of eight input bits into its input register and begins the serialization and encoding process. Loading the serial transmitter's input register also sets its FULL flag. The activation of this signal both resets the second flip-flop 44 (which de-asserts the /LOAD signal) and clocks the input selection counter 45. The decoded selection count enables the output drivers of the next set of flip-flops 44. After a few serial bits have been transmitted, the serial transmitter 37 de-asserts its FULL flag, which releases the second flip-flop to clock on the next rising edge of the clock oscillator 53.

This cycle of the second flip-flop setting, asserting /LOAD, the encoder responding with FULL, de-asserting /LOAD and the select counter incrementing, FULL de-asserting repeats until the ripple-carry-out from the select counter resets the first flip-flop 44. Resetting the first flip-flop 44 disables the second flip-flop 44 (preventing the assertion of /LOAD) and clears the select counter. This leaves the system waiting for the SOB pulse with the first input channel already selected and the data present at the serial transmitter's input.

Because the LEDs typically are not uniform in brightness or mounting, each photo-darlington 15 receives a different amount of light. This, coupled with the fact that the sensitivity of the photo-Darlingtons 15 peaks in the infra-red region typical of silicon photodetectors while the LEDs generate a narrow red spectrum well below the infra-red prevents the photo darlingtons 15 from saturating when the LEDs are on. This means that when operated in an open-collector mode, the photo darlingtons may not sink enough current to generate valid logic LOWs for the input registers. To remedy this, the outputs of the photo darlingtons 15 are compared against a reference voltage at voltage comparators 26, allowing the detection of logic LOWs that are actually higher than that required for normal logic HIGH levels. But because the comparators 26 are relatively slow, their outputs are buffered through Schmitt-trigger gates to prevent problems with the input D flip-flops 44.

Circuit details of the transmitter 19 are shown in FIG. 4. Threshold comparators 41, shown in detail as LM339 comparators in FIG. 5, may be optionally installed to control the effective sensitivity of the photodetector assemblies 17. An octal line driver 43 supplies signals to one or more banks of D-flip flops 44. Flip flop 44 provides its output to the high speed transmitter 37. A counter 45 controls multiplexers 46, 47 for selectively enabling the banks of flip flops 44. Logic circuitry, including flip flops 48 and 49 respond to signal sequences of the monitored signals.

The communication of the data is accomplished by transmitting the data in an optical format through a fiber optic connection, cable 21. A fiber optic transmitter 39 is used to convert the serial data from the high speed transmitter 37 to the optical format.

Figure 6:
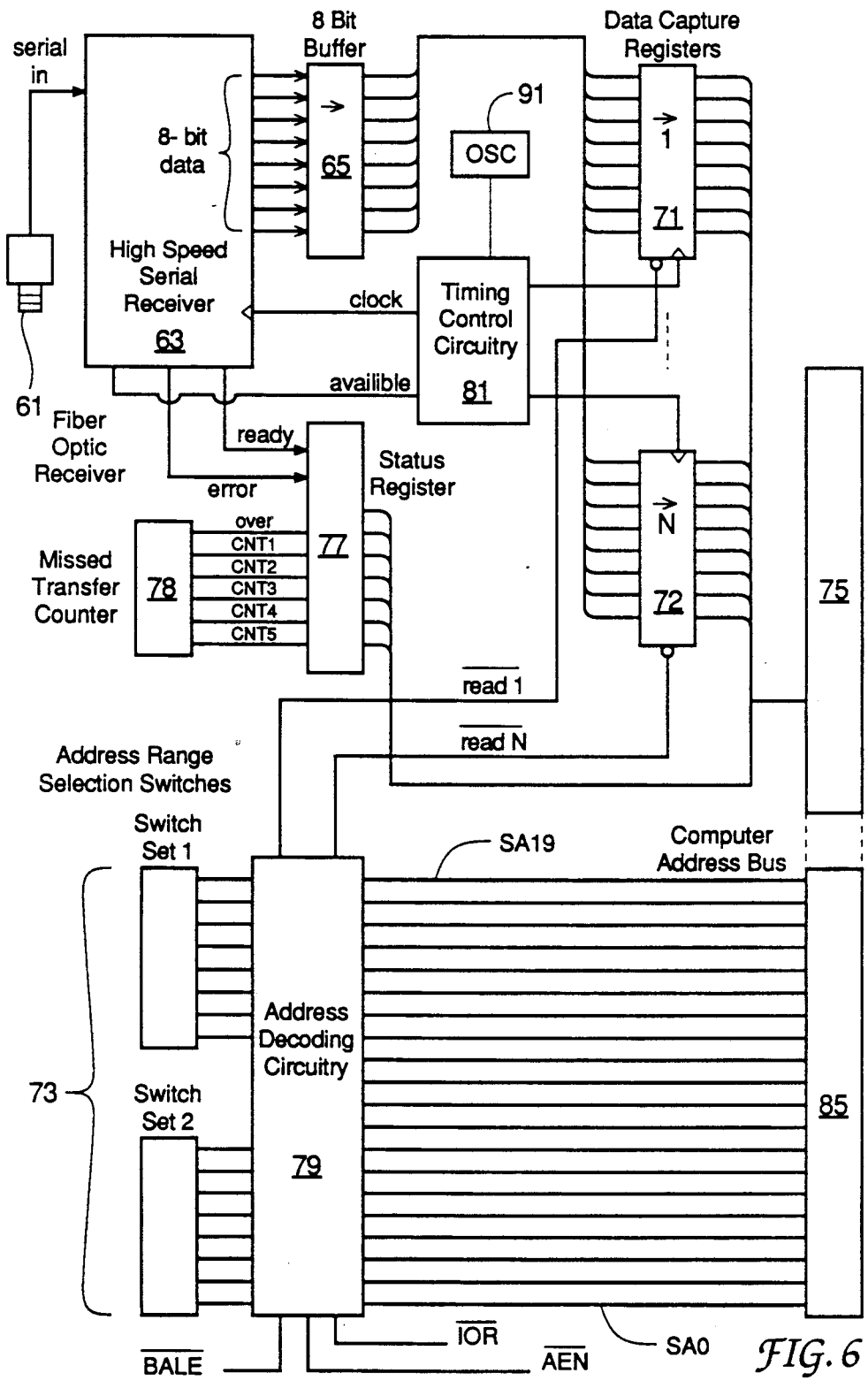
FIG. 6 is a block diagram of a receiver circuit and computer interface card used with the embodiment of FIG. 1.

The receiver card 23, shown in FIG. 6, includes an optical port 61, which is a fiber optic receiver, such as a Hewlett Packard HFBR 2406/16 receiver. The optical port 61 converts the optical format data to a serial data train, which is received by a high speed serial receiver 63. The receiver 63 transmits a parallel output of data to a data buffer 65, which, in turn, transmits the data to one or more data capture registers or input registers 71, 72. The data from the data capture registers 71, 72 may then be addressed through the computer's data bus 75.

A status register 77 is also connected to the data bus and receives READY and ERROR signals from the high speed serial receiver 63. The status register is connected to a counter 78, so that the status register 77 is able to compare a sequence received from the data bus 75 and provide the computer (through the data bus) with data concerning an acceptable sequence of data. The use of the status register 77 permits the determination in real time of a system error by simply comparing a sequence from the receiver 63 with a value provided to the register 77 from the computer 25 through the bus 75.

The status register 77 resides at the computer base address, which is defined by an address decoder 79, as will be explained. The status register 77 resides at the base address, and the data registers for up to fifteen ports reside at the base address plus one through the base address plus hex F.

As is the case with the transmitter 19, the transfer of data from the receiver 63 to the buffer 65 and the data capture registers 71, 72 is controlled by a timing and control circuit 81, which enables the data capture registers when data is available. Timing and control circuit 81 also provides a clock signal to control the transmission of data from the high speed serial receiver 63.

The computer uses an address bus 85 to address commands to the card 23. The address decoder 79 is connected to the address bus 85 and is used to interpret the commands. The card 23 has a switch 73 which is connected to the address decoder 79 for selecting a base address to be used in addressing the status register 77.

The use of an internal oscillator 91, which is connected to the timing and control circuit 81 permits the timing and control circuit 61 to transmit the clock signal to the high speed serial receiver 63 at a rate which is independent of the computer's clock and microprocessor speed. Thus, data may be sampled from the PLC at rates which could not otherwise be supported by the computer 25.

Referring to FIG. 6, the receiver card 23 consists of the fiber-optic receiver 61, high-speed serial receiver/decoder chip 63, a number of 8-bit data registers which form the data buffer 65 and associated selection logic, switch selectable i/o address decoding 79, transmission status register 77, and a clock oscillator 91.

the receiver card 23 provides is connected to the computer 25, and the computer provides control signals which are used to control transfer of data from the receiver card 23 to the computer 25. These include ALE (referred to herein as BALE), which is an address latch enable signal, AEN which is an "address enable" signal to allow direct memory access transfers to take place, and IOR, which is an input/output read command.

In operation, the decoder chip 63 reads the serial data provided by the fiber optic receiver 61 and generates an ACTIVE signal when a burst transmission is being received. Asserting ACTIVE also increments a missed transfer counter.

When each received data byte is received, the decoder chip 63 asserts AVAIL, which releases the set input of a D flip flop in the registers 65. On the next rising edge of the clock oscillator 91, the flip-flop generates a /READ signal. This enables the output drivers on the decoding chip 63 and simultaneously enables the output registers 65. At the next rising edge of the oscillator clock 91, /READ is de-asserted, causing the selected output register 65 to latch the data presented by the decoding chip 63. Subsequently, the decoding chip 63 de-asserts AVAIL, which prevents the flip-flop from clocking until the next byte is received and ready, and increments the select counter.

This cycle of receiving a byte, asserting AVAIL, asserting then de-asserting /READ to latch the byte, then de-asserting AVAIL to increment the select counter is repeated until the decoding chip 63 detects that end of the burst transmission. ACTIVE is then de-asserted, which in turn asserts /RDY.

The data and status registers 71, 72, 77 are read by the computer 25 by asserting the bus signal /IOR after placing the appropriate i/o address on the system address lines SAO—SA19 with /BALE and /AEN. The i/o address is compared to the one set on the dip switches. If the upper four nibbles match, the lowest nibble is decoded through the 1-of-8 demultiplexers to generate a single read-register strobe /RDR1-/RDR15 or /RDSTAT (also referred to as /STATUS).

If /STATUS is asserted when no transmission is being received (/RDY is asserted), all the received data registers 71, 72 are clocked into holding registers simultaneously, and the status register is updated just as its contents are placed on the computer's data bus. Updating the status also clears the missed transfer counter 78 and overflow flag.

The status register 77 contains the /RDY flag, a transmission error flag, and a missed transfer counter overflow flag.

Under normal operating conditions, the receiver portion 23 functions automatically, asynchronously to, and independently of the computer bus. The status register 77 provides a method to temporarily synchronize the two. By reading the status register 77 when no transmission is being received, the output registers 71, 72 are automatically updated so that they can be read with confidence, even if a new transmission starts (and some bytes are received) before completing the read of all the data registers.

The missed transfer counter 78 provides a way to tell how many transfers have occurred since the data registers 71, 72 were last read out. If the missed transfer counter 78 reached a specific upper limit, the overflow flag is set until it is read out with the status. This capability also allows the executing program to figure out how often it is sampling the data with a resolution much better than normally available on a PC.

We claim:

1. An apparatus for sampling signal timing states of equipment which has a signal output of operational states, and the signal output occurs in a substantially real time relationship to the operational states, comprising:

(a) a monitor interface for monitoring the signal output of the operational states and providing signals representative of the operational states;

(b) the monitor being electrically isolated from signals on the equipment which are being monitored and requiring no extra strobes or setup data from the equipment;

(c) a data latch for receiving the signals representative of the operational states in a parallel format and transmitting a latched output in response to a latch enable signal;

(d) a serial transmitter receiving signals from the data latch and providing corresponding signals in a serial format;

(e) timing and control circuitry for controlling a timing sequence of the latch enable signal and the receipt by the serial transmitter of the signals;

(f) a receiver circuit connected to a computer processing unit and having a data register which is addressable by the computer processing unit, wherein said receiver circuit receives the signals in the serial format and provides signals representative of said signal output of the operational states in a format which may be addressed by the computer processing unit; and (g) means to clock the receipt by the serial transmitter of the signals and for providing signals of said signal output of the operational states in the computer addressable format, the means to clock being independent of a clock speed of the computer processing unit.

2. Apparatus for sampling signal timing states as described in claim 1, wherein:

the timing and control circuit is part of the monitor interface; and the timing and control circuit further includes a control for selecting the sampling rate for sampling the signal timing states.

3. Apparatus for sampling signal timing states as described in claim 1, wherein:

the timing and control circuit is part of the monitor interface; and the timing and control circuit further includes a control for selecting the sampling rate, said control including an address decoder for responding to signals from the computer processing unit.

4. Apparatus for sampling signal timing states as described in claim 1, further comprising:

a threshold voltage adjustment for controlling the sensitivity of the monitor interface to said signal output of the operational states.

5. Apparatus for sampling signal timing states as described in claim 1, wherein:

said equipment is a programmable logic controller for an industrial process machine.

6. Apparatus for sampling signal timing states as described in claim 1, wherein:

said receiver connects directly to a computer back plane bus which receives serial data from said serial transmitter; and said receiver reconstructs the signals in the serial format in input port registers, has user selectable input port addresses, and provides transmission status information including DATA READY, TRANSMISSION ERROR, OVERFLOW, and binary count of the number of samples transmitted since a previous reading.

7. Apparatus for sampling signal timing states as described in claim 1, wherein:

the monitor interface senses optical outputs of the equipment; and the monitor interface includes photodetector transistors and mounting hardware for use in monitoring signal indicator LED states of industrial programmable logic controllers, and for the purpose of monitoring the signal timing without direct connection to the programmable logic controller electronics, and with the advantage of allowing mounting and removal of the apparatus for sampling signal timing states without disassembly of the programmable logic controller or interruption of continuous operation of the programmable logic controller.

8. Apparatus for sampling signal timing states as described in claim 1, wherein:

said timing and control circuitry includes an interval selection circuit; and said interval select circuit generates sampling intervals at a rate slightly above a Nyquist sampling rate of said signal outputs.

9. Apparatus for sampling signal timing states as described in claim 1, further comprising:

(h) a fiber optic transmitter receiving the serial format signals provided by the serial transmitter and transmitting an optical output modulated by the serial format signals; and (i) said receiver including a fiber optic port capable of receiving the modulated optical output and providing the receiver circuit with said signals in the serial format.

10. Apparatus for sampling signal timing states as described in claim 9, wherein:

the means to clock includes at least one oscillator, and said means to clock provides a clocking signal to the receiver circuit and provides a clocking signal to the timing and control circuitry.

11. Apparatus for sampling signal timing states as described in claim 1, wherein:

the monitor interface senses optical outputs of the equipment.

12. Apparatus for sampling signal timing states as described in claim 11, further comprising:

a threshold voltage adjustment for controlling the sensitivity of the monitor interface to said signal output of the operational states.

13. A method of monitoring signal timing of an electrical system with a computer which is located in a remote location from the electrical system, comprising:

(a) monitoring signal output of the operational states and providing signals representative of the operational states at a monitor interface, using monitoring apparatus which is electrically isolated from said electrical system and signals which are being monitored and wherein said monitoring requires no extra strobes or setup data from said electrical system;

(b) receiving the signals representative of the operational states in a parallel format and transmitting a latched output in response to an enable signal;

(c) receiving the latched output and providing corresponding signals in a serial format;

(d) controlling a timing sequence of the enable signal and the receipt of the latched output;

(e) receiving the signals in the serial format and providing the signals in a data register which is addressable by a computer processing unit; and (f) clocking the receipt by the serial transmitter of the signals and the providing signals of said signal output of the operational states in the computer addressable format, the clocking being independent of a clock speed of the computer processing unit.

14. Method for monitoring signal timing of an electrical system as described in claim 13, further comprising:

(g) converting the signals in the serial format to an optical output modulated by the serial format signals; and (h) receiving the modulated optical output and converting the modulated optical output to signals in the serial format.

15. Method for monitoring signal timing of an electrical system as described in claim 13, further comprising:

(g) using at least one oscillator to clock the receipt; and (h) providing a clocking signal to the receiver circuit and providing a clocking signal to the timing and control circuitry.

16. Method for monitoring signal timing of an electrical system as described in claim 13, further comprising:

providing a selectable sampling rate of the signal timing of the electrical system at the monitor interface by adjusting the timing and control sequence.

17. Method for monitoring signal timing of an electrical system as described in claim 13, further comprising:

using an address decoder for responding to signals from the computer processing unit in order to control to provide a selectable sampling rate of the signal timing of the electrical system at the monitor interface.

18. Method for monitoring signal timing of an electrical system as described in claim 13, further comprising:

adjusting a threshold voltage for controlling the sensitivity of the monitor interface to the signal output of the operational states.

19. Method for monitoring signal timing of an electrical system as described in claim 13, further comprising:

the electrical system being a programmable logic controller for an industrial process machine.

20. Method for monitoring signal timing of an electrical system as described in claim 13, further comprising:

said providing the signals in a data register which is addressable by a computer processing unit being through a computer connection connected directly to a computer back plane bus.

21. Method for monitoring signal timing of an electrical system as described in claim 13, further comprising:

reconstructing said signals which are provided in the serial format in input port registers, providing the reconstructed signals through input port addresses, and providing transmission status information including DATA READY, TRANSMISSION ERROR, OVERFLOW, and binary count of the number of samples transmitted since a previous reading.

22. Method for monitoring signal timing of an electrical system as described in claim 13, further comprising:

(g) selecting the timing and control sequence interval; and (h) the selected interval generating sampling intervals at a rate slightly above a Nyquist sampling rate of the signal output of the operational states.

23. Method for monitoring signal timing of an electrical system as described in claim 13, further comprising:

monitoring optical outputs at the monitor interface as said signal outputs of the electrical system.

24. Method for monitoring signal timing of an electrical system as described in claim 23, further comprising:

adjusting a threshold voltage for controlling the sensitivity of the monitor interface to the signal output of the operational states.

* * * * *